(12) United States Patent
Woodell et al.

(10) Patent No.: US 6,842,543 B2
(45) Date of Patent: *Jan. 11, 2005

(54) METHOD OF IMPROVING A DIGITAL IMAGE HAVING WHITE ZONES

(75) Inventors: Glenn A. Woodell, Newport News, VA (US); Daniel J. Jobson, Newport News, VA (US); Zia-ur Rahman, Williamsburg, VA (US)

(73) Assignees: Science and Technology Corporation, Hampton, VA (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 592 days.

This patent is subject to a terminal disclaimer.

(21) Appl. No.: 09/888,816

(22) Filed: Jun. 25, 2001

(65) Prior Publication Data

US 2003/0026494 A1 Feb. 6, 2003

(51) Int. Cl.$^7$ ................................................ G06T 5/00
(52) U.S. Cl. ........................ 382/274; 382/254; 382/162
(58) Field of Search ................................ 382/254, 162, 382/260, 279, 274; 358/447, 448, 461, 530, 532; 345/20, 63, 77, 581, 546, 690

(56) References Cited

U.S. PATENT DOCUMENTS

| | | | |
|---|---|---|---|
| 5,991,456 A | 11/1999 | Rahman | 382/254 |
| 6,064,768 A * | 5/2000 | Hajj et al. | 382/195 |
| 6,603,864 B1 * | 8/2003 | Matsunoshita | 382/100 |
| 2003/0072496 A1 * | 4/2003 | Woodell et al. | 382/260 |

FOREIGN PATENT DOCUMENTS

JP           06054840 A  *  3/1994  ............ A61B/6/03

OTHER PUBLICATIONS

E.H. Land, "Color Vision and The Natural Image," Proc. Nat. Acad. Sci., vol. 45, p. 115–129, 1959.
E.H. Land, "An Alt. Tech. for the Comp. of the Des. in the Retinex Th. of Color Vision," Proc. NAS, vol. 83, p3078–3080, 1986.
A. Moore et al., "Real–Time Neural Sys. for Color Const.," IEEE Trans. Neur. Net., vol. 2, p. 237–247, 1991.

* cited by examiner

Primary Examiner—Leo Boudreau
Assistant Examiner—Dennis Rosario-Vasquez
(74) Attorney, Agent, or Firm—Peter J. Van Bergen

(57) ABSTRACT

The present invention is a method of processing a digital image that is initially represented by digital data indexed to represent positions on a display. The digital data is indicative of an intensity value $I_i(x,y)$ for each position (x,y) in each i-th spectral band. The intensity value for each position in each i-th spectral band is adjusted to generate an adjusted intensity value for each position in each i-th spectral band in accordance with $$\sum_{n=1}^{N} W_n (\log I_i(x, y) - \log [I_i(x, y) * F_n(x, y)]), i = 1, \ldots, S$$

where $W_n$ is a weighting factor, "*" is the convolution operator and S is the total number of unique spectral bands. For each n, the function $F_n(x,y)$ is a unique surround function applied to each position (x,y) and N is the total number of unique surround functions. Each unique surround function is scaled to improve some aspect of the digital image, e.g., dynamic range compression, color constancy, and lightness rendition. The adjusted intensity value for each position in each i-th spectral band of the image is then filtered with a filter function to generate a filtered intensity value $R_i(x,y)$. To prevent graying of white zones in the image, the maximum of the original intensity value $I_i(x,y)$ and filtered intensity value $R_i(x,y)$ is selected for display.

36 Claims, 3 Drawing Sheets

US 6,842,543 B2

METHOD OF IMPROVING A DIGITAL IMAGE HAVING WHITE ZONES

STATEMENT OF GOVERNMENT INTEREST

This invention was made with Government support under contract NCC-1-258 awarded by NASA. The Government has certain rights in this invention.

CROSS-REFERENCE TO RELATED PATENT APPLICATIONS

This patent application is co-pending with one related patent application entitled "METHOD OF IMPROVING A DIGITAL IMAGE AS A FUNCTION OF ITS DYNAMIC RANGE", filed on the same date by the same inventors and owned by the same assignees as this patent application.

FIELD OF THE INVENTION

The invention relates generally to image processing, and more particularly to a method of improving a digital image that includes white zones which may be grayed during image processing.

BACKGROUND OF THE INVENTION

When compared to the direct observation of scenes, color images in general have two major limitations due to scene lighting conditions. First, the images captured and displayed by photographic and electronic cameras suffer from a comparative loss of detail and color in shadowed zones. This is known as the dynamic range problem. Second, the images are subject to color distortions when the spectral distribution of the illuminant changes. This is known as the color constancy problem. (Note that for non-color imaging including non-optical imaging, the problem becomes simpler and is largely one of dynamic range compression, i.e., the capture and representation of detail and lightness values across wide ranging average signal levels that can vary dramatically across a scene.)

Electronic cameras (e.g., cameras based on CCD detector arrays, CMOS technology, etc.) are capable of acquiring image data across a wide dynamic range. This range is suitable for handling most illumination variations within scenes, and lens aperture changes are usually employed to encompass scene-to-scene illumination variations. Typically though, this dynamic range is lost when the image is digitized or when the much narrower dynamic range of print and display media are encountered. For example, most images are digitized to 8-bits/color band (256 gray levels/color band) and most display and print media are even more limited to a 50:1 dynamic range.

A commonly encountered instance of the color constancy problem is the spectral difference between daylight and artificial (e.g., tungsten) light which is sufficiently strong to require photographers to shift to some combination of film, filters and processing to compensate for the spectral shift in illumination. Though film photographers can attempt to approximately match film type to spectral changes in lighting conditions, digital cameras must rely strictly on filters. However, these methods of compensation do not provide any dynamic range compression thereby causing detail and color in shadows to be lost or severely attenuated compared to what a human observer would actually see.

Another problem encountered in color and non-color image processing is known as color/lightness rendition. This problem results from trying to match the processed image with what is observed and consists of 1) lightness and color "halo" artifacts that are especially prominent where large uniform regions of an image abut to form a high contrast edge with "graying" in the large uniform zones, and 2) global violations of the gray world assumption (e.g., an all-red scene) which results in a global "graying out" of the image.

Since human vision does not suffer from these various imaging drawbacks, it is reasonable to attempt to model machine vision based on human vision. A theory of human vision centered on the concept of a center/surround retinex was introduced by Edwin Land in "An Alternative Technique for the Computation of the Designator in the Retinex Theory of Color Vision," Proceedings of the National Academy of Science, Volume 83, pp. 3078–3080, 1986. Land drew upon his earlier retinex concepts disclosed in "Color Vision and The Natural Image," Proceedings of the National Academy of Science, Volume 45, pp. 115–129, 1959, but harmonized these with certain findings of the neurophysiology of vision. All of the retinex concepts were intended to be models for human color perception. The earlier retinex concepts involved "random walks" across image space and the resetting of the computation when color boundaries were crossed. Land's 1986 retinex concept of human vision was proposed as a center/surround spatial computation where the center was 2–4 arc-minutes in diameter and the surround was an inverse square function with a diameter of about 200–250 times that of the center.

The application of Land's human vision theories to image processing has been attempted in the prior art. For example, to mimic the dynamic range compression of human vision, a detector array with integrated processing in analog VLSI silicon chips used a logarithm transformation prior to the surround formation. See "Analog VLSI and Neural Systems," C. Mead, Addison-Wesley, Reading, Mass., 1989. In an attempt to improve color constancy, the implementation of a color retinex in analog VLSI technology is suggested by Moore et al., in "A Real-time Neural System for Color Constancy," IEEE Transactions on Neural Networks, Volume 2, pp. 237–247, March 1991. In Moore et al., the surround function was an exponential and final processing before display of the image required the use of a variable gain adjustment that set itself by finding the absolute maximum and minimum across all three color bands' signal values. However, none of the above-described prior art provided an image processing technique that could simultaneously accomplish/improve dynamic range compression, color independence from the spectral distribution of the scene illuminant, and color/lightness rendition.

To address these issues, U.S. Pat. No. 5,991,456 discloses a method of improving a digital image in which the image is initially represented by digital data indexed to represent positions on a display. The digital data is indicative of an intensity value $I_i(x,y)$ for each position (x,y) in each i-th spectral band. The intensity value for each position in each i-th spectral band is adjusted to generate an adjusted intensity value for each position in each i-th spectral band in accordance with $$\sum_{n=1}^{N} W_n(\log I_i(x, y) - \log [I_i(x, y) * F_n(x, y)]), i = 1, \ldots, S$$

where $W_n$ is a weighting factor, "*" is the convolution operator and S is the total number of unique spectral bands. For each n, the function $F_n(x,y)$ is a unique surround function applied to each position (x,y) and N is the total number of unique surround functions. Each unique surround function is scaled to improve some aspect of the digital image, e.g., dynamic range compression, color constancy, and lightness rendition. The adjusted intensity value for each position in each i-th spectral band is filtered with a common function. The improved digital image can then be displayed and is based on the adjusted intensity value for each i-th spectral band so-filtered for each position. For color images, a color restoration step can be added to give the image true-to-life color that closely matches human observation.

While this patented method performs well for scenes/images having widely varying lighting, reflectance and/or topographic features (referred to hereinafter as wide dynamic range images), the method provides a lesser degree of improvement for scenes/images having constrained lighting, reflectance and/or minimal topographic variations (referred to hereinafter as narrow dynamic range images). Furthermore, it has been found that the use of this patented method can cause large "white" zones in digital images to be "grayed". The larger and more constant the white zone, the greater the degree of graying. Such white zones are commonly found in artificial images generated by both computer graphics and document imaging applications.

SUMMARY OF THE INVENTION

Accordingly, it is an object of the present invention to provide a method of improving an image created with digital data for both color and non-color images.

Another object of the present invention to provide a method of improving a digital image in terms of the image's dynamic range compression, color independence from the spectral distribution of the scene illuminant, and color/lightness rendition.

Still another object of the present invention to provide a method of improving a digital image so that the image appears similar to what is perceived by human vision in all kinds and levels of lighting across the entire scene.

A further object of the present invention is to provide a method of reducing the "graying" of large white zones in a processed digital image.

Yet another object of the present invention is to provide a method of improving a digital image that reduces the "graying" of large white zones during image processing regardless of the image's dynamic range.

Other objects and advantages of the present invention will become more obvious hereinafter in the specification and drawings.

In accordance with the present invention, a method is provided for processing a digital image having white zones. The image is initially represented by digital data indexed to represent positions on a display. The digital data is indicative of an intensity value $I_i(x,y)$ for each position $(x,y)$ in each i-th spectral band. The intensity value for each position in each i-th spectral band is adjusted to generate an adjusted intensity value for each position in each i-th spectral band in accordance with $$\sum_{n=1}^{N} W_n(\log I_i(x, y) - \log[I_i(x, y) * F_n(x, y)]), i = 1, \ldots, S$$

where $W_n$ is a weighting factor, "*" is the convolution operator and S is the total number of unique spectral bands. For each n, the function $F_n(x,y)$ is a unique surround function applied to each position $(x,y)$ and N is the total number of unique surround functions. Each unique surround function is scaled to improve some aspect of the digital image, e.g., dynamic range compression, color constancy, and lightness rendition. The adjusted intensity value for each position in each spectral band of the image is filtered with a filter function to generate a filtered intensity value $R_i(x,y)$. The filter function can be a common function or can be selected/defined based upon the image's dynamic range. In either case, to prevent graying of white zones in the image, a maximum intensity value $V_i(x,y)$ is selected from the original intensity value $I_i(x,y)$ and filtered intensity value $R_i(x,y)$. The maximum intensity value $V_i(x,y)$ can be supplied to a display for interpretation thereby as is well understood in the art.

DETAILED DESCRIPTION OF THE INVENTION

Figure 1:
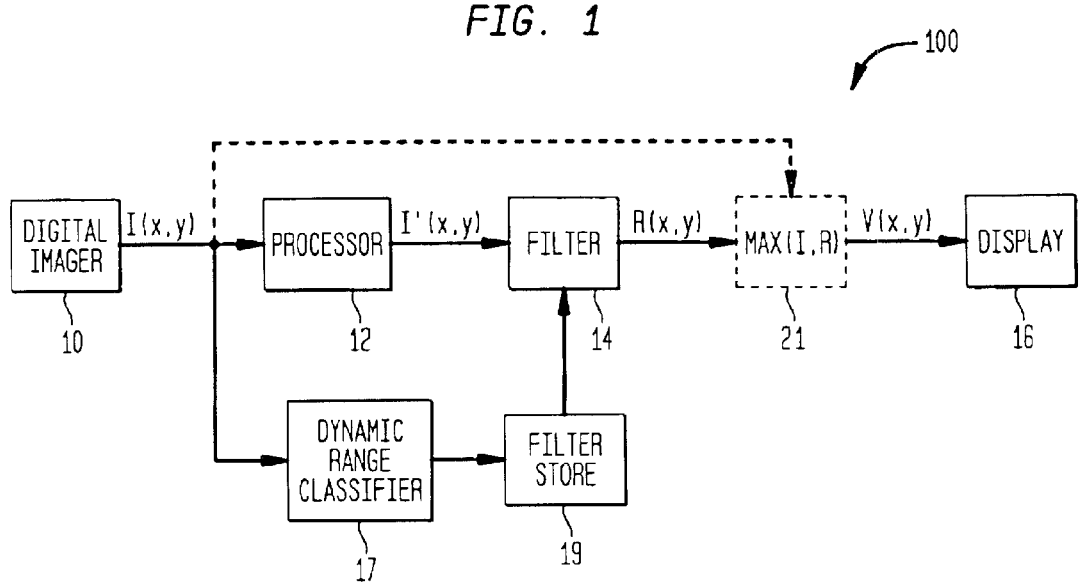
FIG. 1 is a schematic view of an image processing system used to carry out a first embodiment of the method of the present invention that adjusts to the image's dynamic range and, optionally, the presence of white zones, in a known image processing system designed to improve the image in terms of dynamic range compression, lightness rendition, or a balance between these two image criteria.

Referring now to the drawings, and more particularly to FIG. 1, a system 100 is shown for carrying out a first embodiment of the present method. Using this embodiment of the method, the emphasis of image improvement can be placed on either the dynamic range compression, lightness rendition, or a balance between these two image performance criteria. By way of example, the first embodiment will be described as it relates to a non-color digital image. However, it is to be understood that the present method can be extended to color images as will be explained in detail below.

In general, system 100 is based on the system and method described in U.S. Pat. No. 5,991,456 (the '456 patent), the contents of which are hereby incorporated by reference. The '456 patent assumes that the image to be improved has a wide dynamic range, i.e., the image has intensities spanning substantially or fully across the display's dynamic range capability. However, this is not always the case as dynamic range can be reduced or narrowed by, for example, lighting conditions, a subject in an image having minimal contrasting features, etc. Accordingly, in general, the present invention is useful for improving images irrespective of the image's dynamic range. More specifically, the present invention evaluates the dynamic range of the image and adapts itself thereto.

System 100 includes a digital imager 10, e.g., camera, capable of outputting image data in the form of digital data indexed to represent the intensity I at a particular position (x,y) in the image to be displayed on a display 16. For purpose of the present invention, a "position" in the image is no larger than one pixel of the display. However, by way of example, it will be assumed herein that each position (x,y) refers to a single row/column pixel position of display 16 which is a J-row by K-column display. The intensity of each pixel or I(x,y) is adjusted and filtered in accordance with the present method by processor 12 and filter 14 as will now be detailed.

On a pixel-by-pixel basis, processor 12 adjusts the intensity I(x,y) to yield I'(x,y) in accordance with $$I'(x,y) = \log I(x,y) - \log[I(x,y) * F(x,y)] \quad (1)$$

where F(x,y) is a surround function and "*" denotes the convolution operation. Note that prior art processing schemes adhering closely to natural vision science, i.e., an approximate log photoreceptor response, teach a general indifference with respect to the placement of the log response. However, if the logarithm function is taken before the surround function, the resulting discrete convolution of log [I(x,y)*F(x,y)] is equivalent to a weighted product of I(x,y) whereas the second term in equation (1) produces a weighted sum. This is closely related to the difference between the arithmetic mean and the geometric mean except that F(x,y) is selected so that $$k \int\int F(x,y) dx dy = 1 \quad (2)$$

which does not produce exactly the n-th root of n numbers as the geometric mean would. The value k is a normalization constant. The form of equation (1) produces a point-by-point ratio to a large regional mean value.

The surround function F(x,y) must take into account "global" contributions at each pixel position while recognizing that each pixel position is most affected by "regional" contributions. To cover both of these contributions becomes the goal of the surround function. The preferred surround function for the present invention is of the Gaussian form $$F(x, y) = e^{\frac{-r^2}{c^2}} \quad (3)$$

where $$r = \sqrt{x^2 + y^2} \quad (4)$$

and c is a constant determining whether the adjustment of each pixel's intensity I(x,y) is optimized for either dynamic range compression or improved lightness rendition.

In general, constant c is selected to be in the approximate range of 1–50% of the largest (pixel) dimension of the image. For example, if the image had a J by K resolution of 1024 by 768 pixels, the contant c would fall in the approximate range of 10 to 512. To emphasize dynamic range compression improvement, smaller values of c are used, i.e., in the approximate range of 1–20% of the larger of J or K. To emphasize lightness rendition improvement, larger values of c are used, i.e., in the approximate range of 40–50% of the larger of J or K. To compromise or achieve a balance between these two performance criteria, the constant c for this first embodiment is in the approximate range of 15–40% of the larger of J or K. Note that this middle range represents a reasonable compromise where shadows are fairly compensated and rendition achieves acceptable levels of image quality. This is qualitatively compatible with human visual perception in that the treatment of shadows is influenced by their spatial extent. Thus, larger shadows tend to be more compensated (less dark) while smaller shadows appear less compensated (blacker and with less visible internal detail). Thus, for narrow-dynamic images, a single-scale (i.e., single value for the constant c) retinex approach is generally sufficient.

The adjusted intensity value I'(x,y) must be filtered by filter 14 to yield a retinex output R(x,y) which is essentially a pixel intensity value that can be interpreted by a display. Filter 14 applies an offset and gain function to convert I'(x,y) from the logarithm domain to the digital domain of R(x,y) where it can be interpreted by a conventional display 16 as is known in the art. For example, if the display is an 8-bit color monitor, filter 14 must convert each I'(x,y) to a digital value between 0 and 255. In contrast to the previously-mentioned '456 patent which utilized the same function for all images, filter 14 in the present invention applies a dynamic range specific offset and gain function to all pixels in a given image. Accordingly, system 100 also includes a dynamic range classifier 17 and a filter store 19 to provide filter 14 with a selected offset and gain function based upon the dynamic range of a given image. In general, each image is evaluated in terms of its dynamic range at classifier 17. The results of the evaluation are used to select an offset and gain function from store 19 for application by filter 14 to the evaluated image. The image is classified as belonging to one of P dynamic range classes. Each p-th dynamic range class has a predetermined, optimal offset and gain filter function maintained in store 19. In other words, the output of classifier 17 is used to select the best offset and gain function for a particular dynamic range classification.

Dynamic range evaluation carried out by classifier 17 can be accomplished in a variety of ways utilizing well known statistics associated with the image being processed. Such statistics include the mean of a spectral band's intensity or brightness, the standard deviation of the mean or contrast, the skewness of a spectral band's intensity, first and second order moments of a spectral band's intensity, and other known types of image statistics.

By way of illustrative example, dynamic range classifier 17 can be implemented as follows. The image to be processed is classified as belonging to one of P dynamic range classes depending on the relationship between the magnitude the image's mean $\mu$ (or brightness) and standard deviation $\sigma$ thereof (or contrast) in each i-th spectral band. For each i-th spectral band, $L_{ip}=1$ only if $F(\mu_i,\sigma_i) \geq T_p$, $p=1, \ldots, P$, otherwise $L_{ip}=0$, where $L_{ip}$ is a boolean variable, F( ) denotes a dynamic range evaluation function which, in the illustrated example, uses brightness $(\mu_i)$ and contrast $(\sigma_i)$ of the i-th spectral band as will be explained further below, and $T_p$ denotes a threshold value associated with the p-th dynamic range class. Thus, whenever $F( ) \geq T_p$ for an i-th spectral band of the image, the Boolean variable $L_{ip}$ is set to a value of 1. Letting S designate the total number of spectral bands where i=1, ... , S, this evaluation is performed for all thresholds $T_p$ in all S spectral bands. The resulting array of Boolean values $L_{ip}$ can be used to determine/define the dynamic range class of the image. One simple conditional that can be used is:

$$\sum_{i=1}^{S} L_{ip} = S$$

for a given p, then the p-th offset and gain function is selected from store 19 for use by filter 14 for all S spectral bands of the image."

If this conditional statement is not satisfied for any of the P dynamic range classes, a default offset and gain filter function can be specified. If this conditional statement is satisfied for more than one of the P dynamic range classes, a combination (e.g., average) of the corresponding offset and gain filter functions can be selected/provided from store 19 to filter 14. Other conditional statements using other specific combinations of $L_{ip}$ could also be used.

It is to be understood that the particular function F( ), choice of image statistics used thereby, and conditional statements, are not limitations of the present invention. That is, the particular methodology used by classifier 17 and store 19 to supply filter 14 with an offset and gain filter function predicated on the image's dynamic range can be changed without departing from the scope of the present invention. However, by way of illustrative example, a particular dynamic range classification method using brightness ($\mu_i$) and contrast ($\sigma_i$) for P=5 dynamic range classes can be implemented as follows:

"For p=1 indicative of the i-th spectral band's image having the narrowest dynamic range, $L_{ip}=1$ if $\mu_i>160$ and $\sigma_i<(0.2\mu_i)$."

"For p=2 indicative of the i-th spectral band's image having a narrow dynamic range, $L_{ip}=1$ if $\sigma_i<(0.3\ \mu_i)$."

"For p=3 indicative of the i-th spectral band's image having a less narrow dynamic range, $L_{ip}=1$ if $\sigma_i<(0.5\mu_i)$."

"For p=4 indicative of the i-th spectral band's image having a medium dynamic range, $L_{ip}=1$ if $\sigma_i<(0.6\ \mu_i)$."

"For p=5 indicative of the i-th spectral band's image having a regular dynamic range, $L_{ip}=1$ if $\sigma_i<(0.8\ \mu hd\ i)$."
where the terms "narrowest", "narrow", "less narrow", "medium" and "regular" are used only to indicate relative dynamic range.

As mentioned above, many computer graphics and document imaging applications (that can benefit from the image processing provided by the present invention) contain large white zones which may be grayed by such image processing. In applications where this is of concern, system 100 can optionally include a block 21 (shown in dashed line form to indicate its optional use) that selects a maximum (intensity) value V(x,y) for each position in each of the image's spectral bands. More specifically, $$V(x,y)=\max(I(x,y), R(x,y)) \quad (5)$$

where I(x,y) is the intensity value at each position of the original digital image and R(x,y) is the filtered intensity value output by filter 14. Accordingly, maximizing block 21 insures that the original pixel intensity is never decreased (i.e., grayed) by image processing in accordance with the present invention.

Figure 2:
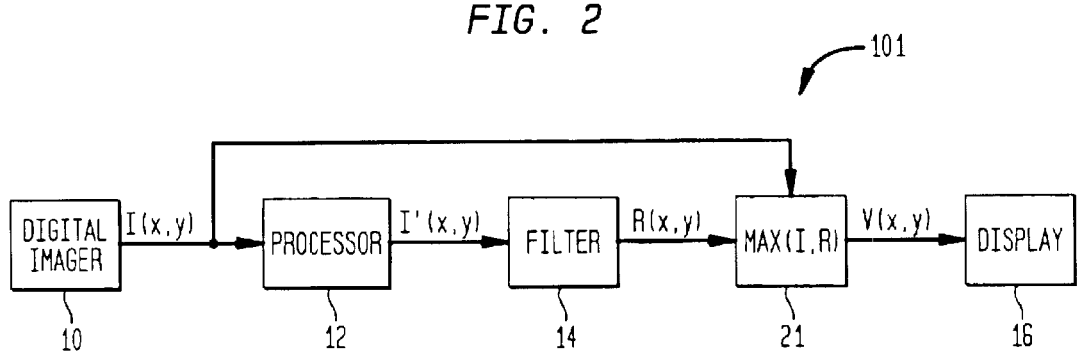
FIG. 2 is a schematic view of an image processing system that compensates for the image's white zones in a known image processing system designed to improve the image in terms of dynamic range compression, lightness rendition, or a balance between these two image criteria.

In tests of the present invention, application of maximizing block 21 produced smooth tonal renderings without tonal discontinuities at points of merger. Further, the use and advantages of maximizing block 21 are independent of the dynamic range adaptation provided by dynamic range classifier 17 and filter store 19. This is true for each of the embodiments that are described herein. Thus, maximizing block 21 could be used to improve upon the teachings of the '456 patent as shown in FIG. 2. Specifically, in FIG. 2, system 101 includes the digital imager 10, processor 12 and filter 14 of the '456 patent where filter 14 applies a common offset and gain function to all images to produce its filtered (intensity) values R(x,y). In system 101, maximizing block 21 performs as before to select the maximum intensity value between the original intensity value I(x,y) and R(x,y) in order to reduce the graying of white zones.

Figure 3:
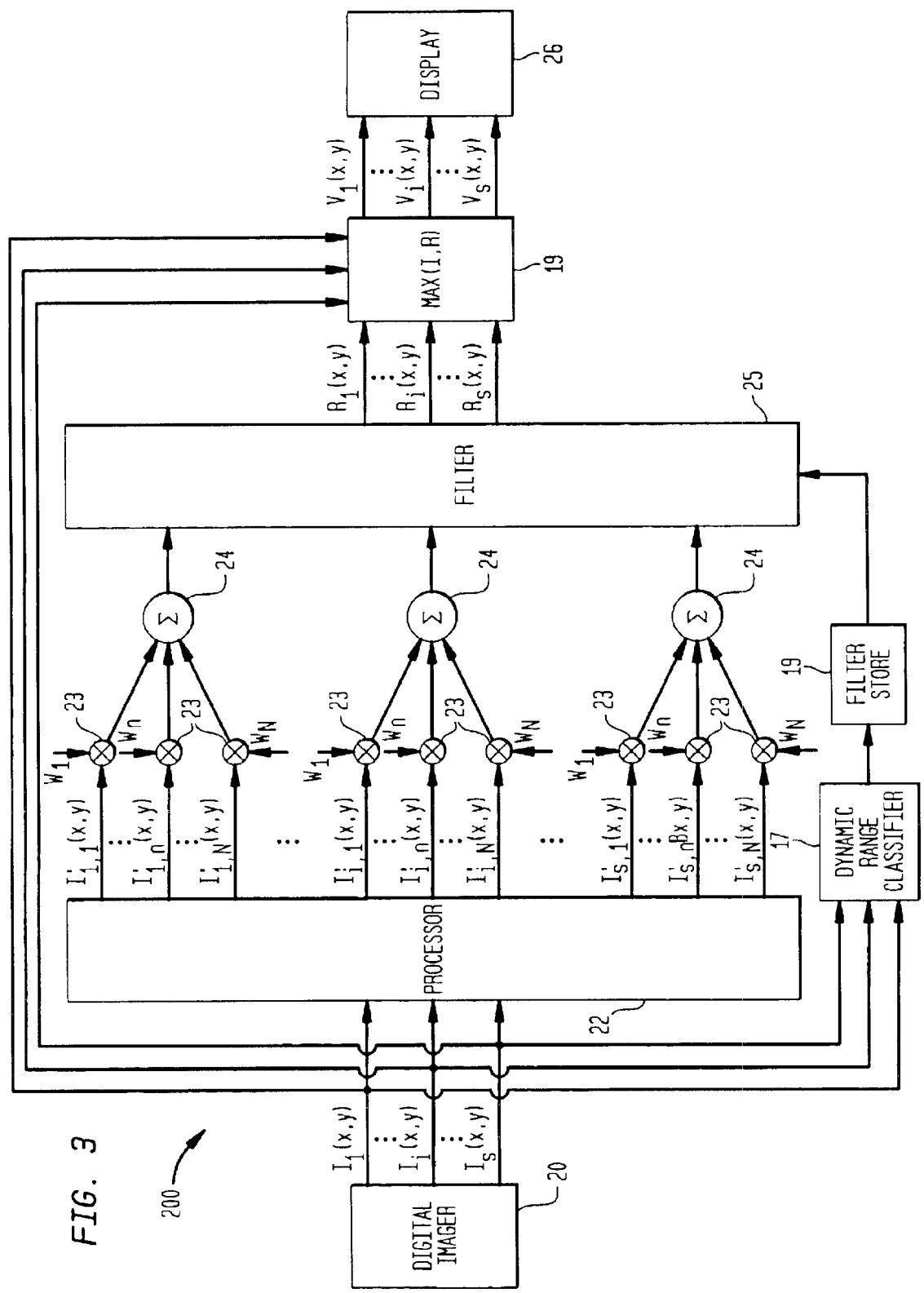
FIG. 3 is a schematic view of an image processing system used to carry out a second embodiment of the method of the present invention that adjusts to the image's dynamic range and the presence of white zones in a known image processing system designed to simultaneously improve the image in terms of both dynamic range compression and lightness rendition.

Referring now to FIG. 3, system 200 is shown for carrying out a second embodiment of the present method. In the second embodiment, it is possible to simultaneously improve both the dynamic range compression and lightness rendition of an image. By way of illustration, the second embodiment will be described as it relates to a color digital image although it could also be to used to improve non-color images. The operation of system 200 could include just the standard color triplet red, green, and blue. However, the present approach can be extended to any number of spectral bands that can be used to develop a digital image. Accordingly, digital imager 20 is shown to output digital image data for each of the spectral bands at each position no larger than a pixel that is ultimately to be displayed on display 26. The intensity of each pixel for each i-th spectral band (e.g., $I_1(x,y)$, $I_2(x,y)$, . . . , $I_i(x,y)$, . . . , $I_s(x, y)$) is available from digital imager 20 where S defines the total number of unique spectral bands.

Similar to the single-scale retinex approach (FIGS. 1 and 2) described above, processor 22 applies equations (1), (3) and (4) on a pixel-by-pixel basis. However, unlike the single-scale approach, each pixel's intensity (in each spectral band) is adjusted a multiplicity of N times where the constant c is uniquely selected each n-th time the surround function F(x,y) is applied to a pixel (of each spectral band). Thus, the preferred Gaussian surround function in equation (3) can be rewritten for the general case as $$F_n(x, y) = e^{\frac{-r^2}{c_n^2}} \quad (6)$$

where $c_n$ is a unique constant for each of the N applications of equation (1). In general, each value of c can be between approximately 1–50% of the larger pixel dimension of the image as described above. However, in this multi-scale approach, N unique values of $c_n$ can be used to adjust each pixel's intensity in each spectral band. For example, if N=3, the three values of $c_n$ could be selected such that the first constant $c_1$ optimized dynamic range compression, the second constant $c_2$ optimized rendition, and the third constant $c_3$ would be between the first and second constant values.

The resulting adjustments to intensity are each weighted by a factor $W_n$ at a multiplier 23 and then added together at a summer 24 for each spectral band. Thus, in general, the multi-scale method applied by processor 22, multipliers 23 and summers 24 can be written as $$\sum_{n=1}^{N} W_n(\log I_i(x, y) - \log [I_i(x, y) * F_n(x, y)]), i = 1, \ldots, S \quad (7)$$

where $W_n$ is the weighting factor, $F_n(x,y)$ represents the uniquely scaled (Gaussian) surround function governed by the choice of constant $c_n$ in equation (6), and S is the total number of unique spectral bands. The weighting factor $W_n$ can be a simple average, e.g., 1/N, that is the same for each $c_n$, or can be unique for each $c_n$ in order to emphasize certain performance criteria more than others for a particular application. Similar to the approach described for system 100, the weighted sums output from summers 24 are all filtered by dynamic range specified offset and gain function at filter 25 to convert the sums into digital data usable by display 26.

More specifically, dynamic range classifier 17 and filter store 19 function as described above for each image provided by digital image 20. That is, each image's i-th spectral band is evaluated/classified in terms of its dynamic range and the resulting classifications are used to select one of several predetermined offset and gain functions maintained at filter store 19. Also similar to system 100, system 200 can include maximizing block 21 to select the maximum intensity value at each pixel position for each spectral band where $$V_i(x,y) = \max(I_i(x,y), R_i(x,y)) \quad (8)$$

Once again, maximizing block 21 can be used independently of dynamic range classifier 17 and filter store 19, i.e., if classifier 17/store 19 were to be omitted so that a common filter function would be applied by filter 25 for all images as is the case in the '456 patent.

As noted above, the single-scale method is limited in its ability to combine dynamic range compression and lightness rendition and further cannot produce good color rendition for a pathological class of images, i.e., the so-called gray-world violations. However, the multi-scale aspect of the present invention synthesizes substantial dynamic range compression with good lightness rendition. Even so, the multi-scale retinex method by itself cannot produce good color rendition for images which violate the gray-world assumption. Thus, a third embodiment of the present invention adds color restoration to the method to achieve the missing capability. The color restoration method produces good color rendition with modest sacrifices in color constancy even for the class of images previously considered pathological. The multi-scale retinex method with color restoration can and has achieved a close approximation to human observation when test scenes are compared to processed images.

Figure 4:
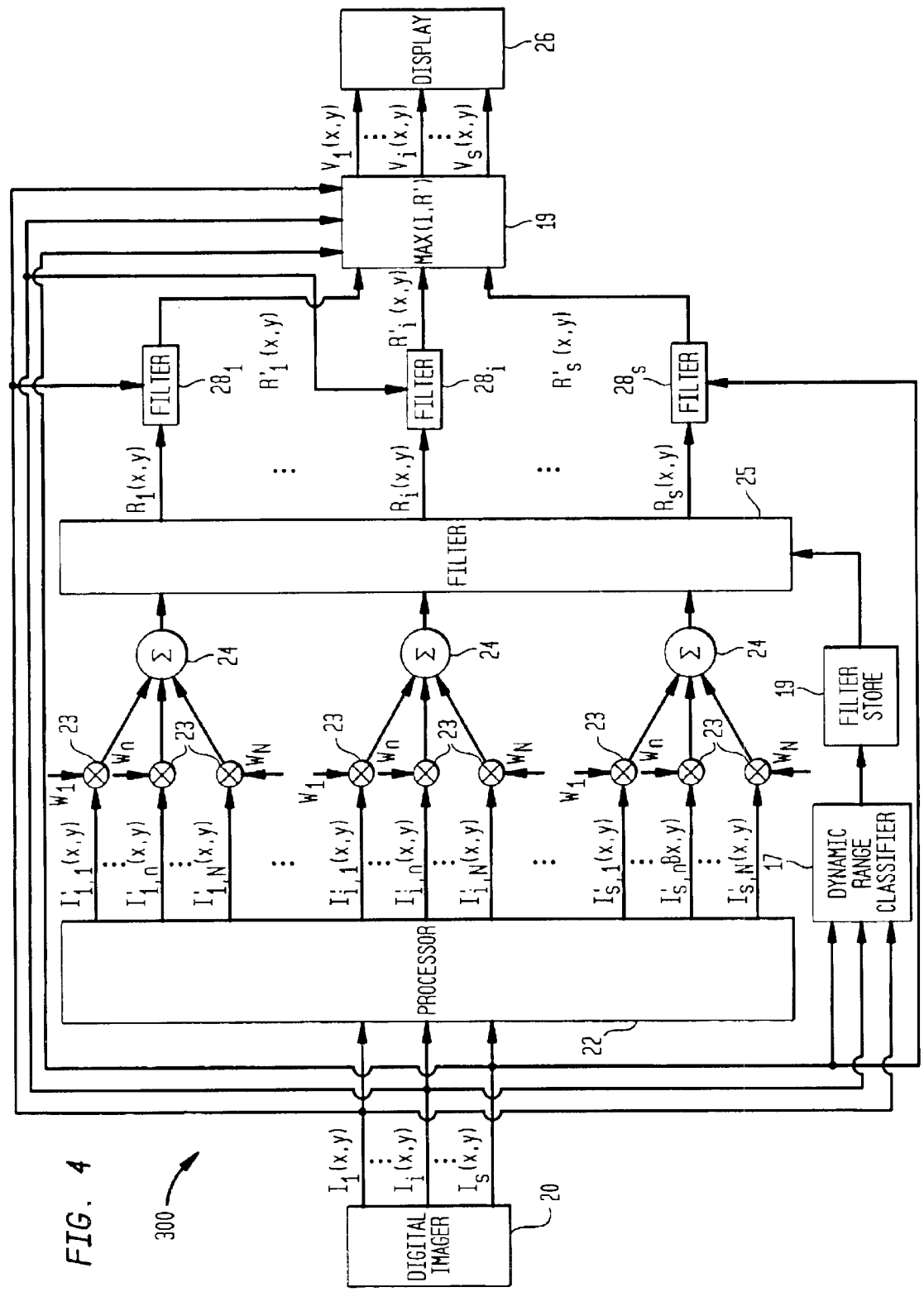
FIG. 4 is a schematic view of the system of FIG. 3 further improved to incorporate a color restoration processing capability in accordance with a third embodiment of the present method.

A system for implementing the method of color restoration is shown in FIG. 4 where system 300 depicts a modification of system 200 that incorporates the apparatus needed to implement the novel color restoration step. More specifically, each respective averaged sum for each spectral band output from one of multipliers 24 is filtered with a dynamic range specific offset and gain function at filter 25 in a fashion similar to that just described above for system 200. The filtered intensity values $R_i(x,y)$ are further multiplied at a respective filter $28_1, \ldots, 28_i, \ldots, 28_s$, having a gain that takes the form $$\log\left[\frac{BI_i(x,y)}{\sum_{i=1}^{S} I_i(x,y)}\right] \quad (9)$$

where B is a constant that is the same for all spectral bands that controls the amount of perceived color saturation and S is a whole number indicative of the total number of spectral bands being used, e.g., S=3 for the standard triplet red, green, blue. The resulting color-restored output intensities $R'_i(x,y)$ could be provided directly to display 26 or optionally processed by maximizing block 21 to select the maximum intensity value at each pixel position for each spectral band where $$V_i(x,y) = \max(I_i(x,y), R'_i(x,y)) \quad (10)$$

Once again, maximizing block 21 can be used independently of dynamic range classifier 17 and filter store 19, i.e., if classifier 17/store 19 were to be omitted so that a common filter function would be applied by filter 25 for all images as is the case in the '456 patent.

The present method can be embodied in a variety of applications. It can be used as a tool in computers for enhancement of images ex post facto. The present method will also find utility in digital photo-processing, image enhancement for different display media, and as a tool for personal/professional needs such as desktop publishing. The present invention could also be used to improve the commercialization of remote sensing data by providing an easily interpretable visual rendition. Various images used by law enforcement (e.g., security surveillance data, forensic data, etc.) could also be improved application of the present invention.

The present method could further be embodied in special purpose processors designed for use with either 8-bit digital color cameras, or wide dynamic range (preferably 10–12 bit/color channel) color electronic cameras. In the wide dynamic range embodiment, the combined camera and processing performance would yield resulting images that approach human visual observation which readily brings out color and detail across very wide ranging illumination conditions (including within an image frame).

The present method could also be used in the development of smart color cameras with embedded computer chips. These chips, which would perform the single or multi-scale retinex processing with dynamic range adjustment and/or white zone processing, could be either analog or digital VLSI depending upon the relative performance at the time of design.

Still another embodiment of the present method could utilize either a separate hardware processor or embedded computer chip for performing a retinex computation with low-light level electronic cameras which use thermoelectric or cryogenic coolers to reduce noise and increase sensitivity and dynamic range. This embodiment should produce high quality color images at low ambient light levels that would exceed human visual performance, i.e., specifically early-dawn/late-twilight/moonlight/dim-interior conditions.

The present invention's multi-scale approach with dynamic range adjustment can also be used in black and white imaging to accomplish dynamic range compression and tonal rendition for images such as medical images (e.g., x-rays, magnetic resonance images, digital mammographic images, etc.) and aerial photographic images. In these instances, the present invention will achieve an improved visualization of anatomical features in medical images and the removal of shading artifacts in aerial photography.

The advantages of the present invention are numerous. Image processing improvements provided by the single-scale retinex, multi-scale retinex and the multi-scale retinex with color restoration, are further enhanced by allowing their filtering step to adapt to images having varying dynamic ranges. This will increase the number and types of images that can be improved by a given system. The method can be implemented as a manual process or, more advantageously, as an automatic processing function as it requires no user inputs or intervention.

Although the invention has been described relative to a specific embodiment thereof, there are numerous variations and modifications that will be readily apparent to those skilled in the art in light of the above teachings. For example, the teachings of the present invention can be implemented in a wide variety of hardware and/or software environments without departing from the scope of the present invention. It is therefore to be understood that, within the scope of the appended claims, the invention may be practiced other than as specifically described.

What is claimed as new and desired to be secured by Letters Patent of the United States is:

1. A method of processing a digital image, comprising the steps of:

providing digital data indexed to represent positions on a display, said digital data being indicative of an intensity value $I_i(x,y)$ for each position (x,y) in each i-th spectral band;

adjusting said intensity value for said each position in each i-th spectral band to generate an adjusted intensity value for said each position in each i-th spectral band in accordance with $$\sum_{n=1}^{N} W_n(\log I_i(x,y) - \log[I_i(x,y) * F_n(x,y)]), i = 1, \ldots, S$$

where S is the number of unique spectral bands included in said digital data and, for each n, $W_n$ is a weighting factor and $F_n(x,y)$ is a unique surround function applied to said each position (x,y) and N is the total number of unique surround functions;

filtering said adjusted intensity value for said each position of said image in each of said S spectral bands using a filter function wherein a filtered intensity value $R_i(x,y)$ is defined; and selecting a maximum intensity value $V_i(x,y)$ from the group consisting of said intensity value $I_i(x,y)$ and said filtered intensity value $R_i(x,y)$.

2. A method according to claim 1 wherein each said unique surround function is a Gaussian function.

3. A method according to claim 2 wherein said Gaussian function is of the form $$e^{\frac{-r^2}{c_n^2}}$$

satisfying the relationship $$k_n \int\int e^{\frac{-r^2}{c_n^2}} dxdy = 1$$

where $$r = \sqrt{x^2 + y^2}$$

and, for each n, $k_n$ is a normalization constant and $c_n$ is a unique constant for each of said N unique surround functions.

4. A method according to claim 1 further comprising the step of multiplying said filtered intensity value $R_i(x,y)$ by $$\log\left[\frac{BI_i(x,y)}{\sum_{i=1}^{S} I_i(x,y)}\right]$$

to define a color-restored intensity value $R'_i(x,y)$, where B is a constant, wherein said step of selecting using said filtered intensity value $R_i(x,y)$ is replaced with the step of selecting a maximum intensity value $V_i(x,y)$ from the group consisting of said intensity value $I_i(x,y)$ and said color-restored intensity value $R'_i(x,y)$.

5. A method according to claim 1 wherein said each position (x,y) defines a pixel of said display.

6. A method according to claim 1 wherein, for each n, $W_n = 1/N$.

7. A method according to claim 1 further comprising the step of displaying an improved image using said maximum intensity value $V_i(x,y)$.

8. A method according to claim 4 further comprising the step of displaying an improved image using said maximum intensity value $V_i(x,y)$.

9. A method according to claim 1 further comprising the steps of:

defining a classification of said image based on dynamic range of said image in each of said S spectral bands; and selecting said filter function based on said classification of said image.

10. A method according to claim 9 wherein said step of defining comprises the step of using image statistics associated with said image in each of said S spectral bands.

11. A method according to claim 10 wherein said image statistics include brightness and contrast of said image in each of said S spectral bands.

12. A method according to claim 4 further comprising the steps of:

defining a classification of said image based on dynamic range of said image in each of said S spectral bands; and selecting said filter function based on said classification of said image.

13. A method according to claim 12 wherein said step of defining comprises the step of using image statistics associated with said image in each of said S spectral bands.

14. A method according to claim 13 wherein said image statistics include brightness and contrast of said image in each of said S spectral bands.

15. A method of processing a digital image, comprising the steps of:

providing digital data indexed to represent the positions of a plurality of pixels of a J-row by K-column display, said digital data being indicative of an intensity value I(x,y) for each of said plurality of pixels where x is an index of a position in the J-th row of said display and y is an index of a position in the K-th column of said display wherein a J×K image is defined;

convolving said digital data associated with each of said plurality of pixels with a function $$e^{\frac{-r^2}{c^2}}$$

to form a discrete convolution value for each of said plurality of pixels, said function satisfying the relationship $$k \int\int e^{\frac{-r^2}{c^2}} dxdy = 1$$

where $$r = \sqrt{x^2 + y^2}$$

k is a normalization constant and c is a constant;

converting, for each of said plurality of pixels, said discrete convolution value into the logarithm domain;

converting, for each of said plurality of pixels, said intensity value into the logarithm domain;

subtracting, for each of said plurality of pixels, said discrete convolution value so-converted into the logarithm domain from said intensity value so-converted into the logarithm domain, wherein an adjusted intensity value is generated for each of said plurality of pixels;

filtering said adjusted intensity value for each of said plurality of pixels with a filter function wherein a filtered intensity value R(x,y) is defined; and selecting, for each of said plurality of pixels, a maximum intensity value V(x,y) from the group consisting of said intensity value I(x,y) and said filtered intensity value R(x,y).

16. A method according to claim 15 wherein the value of said constant c is selected to be in the range of approximately 0.01 to approximately 0.5 of the larger of J and K.

17. A method according to claim 15 further comprising the step of displaying an improved image using said maximum intensity value V(x,y).

18. A method according to claim 15 wherein said step of filtering includes the step of selecting said filter function based on dynamic range of said J×K image.

19. A method of processing a digital image, comprising the steps of:
   providing digital data indexed to represent the positions of a plurality of pixels of an J-row by K-column display, said digital data being indicative of an intensity value $I_i(x,y)$ for each i-th spectral band of S spectral bands for each of said plurality of pixels where x is an index of a position in the J-th row of said display and y is an index of a position in the K-th column of said display wherein a $(J \times K)_i$ image is defined for each of said S spectral bands and a J×K image is defined across all of said S spectral bands;
   convolving said digital data associated with each of said plurality of pixels in each i-th spectral band with a function $$e^{\frac{-r^2}{c_n^2}}$$

for n=2 to N to form N convolution values for each of said plurality of pixels in each said i-th spectral band, said function satisfying the relationship $$k_n \int\int e^{\frac{-r^2}{c_n^2}} dx dy = 1$$

where $$r = \sqrt{x^2 + y^2}$$

and, for each n, $k_n$ is a normalization constant and $c_n$ is a unique constant;
   converting, for each of said plurality of pixels in each said i-th spectral band, each of said N convolution values into the logarithm domain;
   converting, for each of said plurality of pixels in each said i-th spectral band, said intensity value into the logarithm domain;
   subtracting, for each of said plurality of pixels in each said i-th spectral band, each of said N convolution values so-converted into the logarithm domain from said intensity value so-converted into the logarithm domain, wherein an adjusted intensity value is generated for each of said plurality of pixels in each said i-th spectral band based on each of said N convolution values;
   forming a weighted sum for each of said plurality of pixels in each said i-th spectral band using said adjusted intensity values;
   filtering said weighted sum for each of said plurality of pixels in each said i-th spectral band with a filter function wherein a filtered intensity value $R_i(x,y)$ is defined; and
   selecting a maximum intensity value $V_i(x,y)$ from the group consisting of said intensity value $I_i(x,y)$ and said filtered intensity value $R_i(x,y)$.

20. A method according to claim 19 wherein the value for each said unique constant $c_n$ is selected to be in the range of approximately 0.01 to approximately 0.5 of the larger of J and K.

21. A method according to claim 19 further comprising the step of multiplying said filtered intensity value $R_i(x,y)$ by $$\log\left[\frac{BI_i(x,y)}{\sum_{i=1}^{S} I_i(x,y)}\right]$$

to define a color-restored intensity value $R'_i(x,y)$, where B is a constant and S is a whole number greater than or equal to 2, wherein said step of selecting using said filtered intensity value $R'_i(x,y)$ is replaced with the step of selecting a maximum intensity value $V_i(x,y)$ from the group consisting of said intensity value $I_i(x,y)$ and said color-restored intensity value $R'_i(x,y)$.

22. A method according to claim 19 further comprising the step of displaying an improved image using said maximum intensity value $V_i(x,y)$.

23. A method according to claim 21 further comprising the step of displaying an improved image using said maximum intensity value $V_i(x,y)$.

24. A method according to claim 19 further comprising the steps of:
   defining a classification of said J×K image based on dynamic range of each said $(J \times K)_i$ image; and
   selecting said filter function based on said classification of said J×K image.

25. A method according to claim 24 wherein said step of defining comprises the step of using image statistics associated with each said $(J \times K)_i$ image.

26. A method according to claim 25 wherein said image statistics include brightness and contrast of each said $(J \times K)_i$ image.

27. A method according to claim 21 further comprising the steps of:
   defining a classification of said J×K image based on dynamic range of each said $(J \times K)_i$ image; and
   selecting said filter function based on said classification of said J×K image.

28. A method according to claim 27 wherein said step of defining comprises the step of using image statistics associated with each said $(J \times K)_i$ image.

29. A method according to claim 28 wherein said image statistics include brightness and contrast of each said $(J \times K)_i$ image.

30. A method of processing a digital image, comprising the steps of:
   providing digital data indexed to represent positions of an image having S spectral bands for simultaneous output on a display, said digital data being indicative of an intensity value $I_i(x,y)$ for each position (x,y) in each i-th spectral band;
   adjusting said intensity value for said each position in each i-th spectral band to generate an adjusted intensity value for said each position in each i-th spectral band in accordance with $$\sum_{n=1}^{N} W_n(\log I_i(x,y) - \log[I_i(x,y) * F_n(x,y)]), i = 1, \ldots, S$$

where S is a whole number greater than or equal to 2 and defines the total number of spectral bands included in said digital data and, for each n, $W_n$ is a weighting factor and $F_n(x,y)$ is a unique surround function of the form $$e^{\frac{-r^2}{c_n^2}}$$

satisfying the relationship $$k_n \int\int e^{\frac{-r^2}{c_n^2}} dx\,dy = 1$$

where $$r = \sqrt{x^2+y^2}$$

and, for each n, $k_n$ is a normalization constant and $c_n$ is a unique constant where N is the total number of unique surround functions;

filtering said adjusted intensity value for said each position in each i-th spectral band with a filter function wherein a filtered intensity value $R_i(x,y)$ is defined;

multiplying said filtered intensity value $R_i(x,y)$ by $$\log\left[\frac{BI_i(x,y)}{\sum_{i=1}^{S} I_i(x,y)}\right]$$

to define a color-restored intensity value $R'_i(x,y)$, where B is a constant; and selecting a maximum intensity value $V_i(x,y)$ from the group consisting of said intensity value $I_i(x,y)$ and said color-restored intensity value $R'_i(x,y)$.

31. A method according to claim 30 wherein, for each n, $W_n = 1/N$.

32. A method according to claim 30 wherein the value for each said unique constant $c_n$ is selected to be in the range of approximately 0.01 to approximately 0.5 of the larger of J and K.

33. A method according to claim 30 further comprising the step of displaying an improved image using said maximum intensity value $V_i(x,y)$.

34. A method according to claim 30 further comprising the steps of:

defining a classification of said image based on dynamic range of said image in each of said S spectral bands; and selecting said filter function based on said classification of said image.

35. A method according to claim 34 wherein said step of defining comprises the step of using image statistics associated with said image in each of said S spectral bands.

36. A method according to claim 35 wherein said image statistics include brightness and contrast of said image in each of said S spectral bands.

* * * * *